United States Patent
Chang et al.

(10) Patent No.: US 10,784,910 B1
(45) Date of Patent: Sep. 22, 2020

(54) MULTI-ANTENNA JAMMING/INTERFERENCE PROTECTION FOR WAVEFORMS

(71) Applicant: Perspecta Labs Inc., Basking Ridge, NJ (US)

(72) Inventors: Nicholas Chang, Red Bank, NJ (US); Joseph C. Liberti, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 0 days.

(21) Appl. No.: 16/586,396

(22) Filed: Sep. 27, 2019

Related U.S. Application Data

(60) Provisional application No. 62/738,588, filed on Sep. 28, 2018.

(51) Int. Cl.
*H04B 1/12* (2006.01)
*H04B 1/10* (2006.01)
*H04L 5/00* (2006.01)

(52) U.S. Cl.
CPC .......... *H04B 1/126* (2013.01); *H04B 1/1027* (2013.01); *H04L 5/0062* (2013.01)

(58) Field of Classification Search
CPC ...... H04B 1/126; H04B 1/1027; H04L 5/0062
See application file for complete search history.

(56) References Cited

U.S. PATENT DOCUMENTS

| | | | |
|---|---|---|---|
| 2002/0044614 A1* | 4/2002 | Molnar | H04B 1/0003 375/346 |
| 2019/0364453 A1* | 11/2019 | Sahin | H04W 16/10 |

\* cited by examiner

*Primary Examiner* — Nguyen T Vo
(74) *Attorney, Agent, or Firm* — Heslin Rothenberg Farley & Mesiti P.C.

(57) ABSTRACT

Embodiments of the present invention include a system, method and computer program product for mitigating interference in data received by a multiple antenna array. Processor(s) executing program code identify signals from users, including active users, and by identifying these signals, mitigate interference and jamming in the received data, overall.

17 Claims, 10 Drawing Sheets

MULTI-ANTENNA JAMMING/INTERFERENCE PROTECTION FOR WAVEFORMS

BACKGROUND OF INVENTION

Long-Term Evolution (LTE) systems (including handsets or user equipment (UE) and associated radio access networks), originally developed for commercial applications, and other systems employing Orthogonal Frequency-Division Multiplexed (OFDM)-based processing, are being adapted for military uses. The large production volumes of commercial technology and marketplace competition, have led to a degree of integration, miniaturization, lowering of cost, and ease-of-use while dedicated tactical radio has not experienced a similar pace of advances. Rapid technology evolution in the commercial marketplace is also more attractive than tactical radio technology. For example, compact mobile tactical LTE networks (e.g., PacStar, General Dynamics, Oceus, Harris, etc.) are currently available, enabling tactical units to use (on the move or at the halt) dedicated networks that do not depend on in-country hosts.

Although integrating commercial solutions into tactical solutions provides access to useable technology, integrating consumer functionality into military environments can introduce security concerns. Existing LTE solutions, including those customized for tactical applications, are vulnerable to electronic (and potentially kinetic) threats because these systems typically need to rely on enabling commercial chipsets, which specify the over-the-air waveform, and need to be inter-operable with other equipment. Thus, currently available tactical LTE systems are subject to detection, interception, geolocation, jamming, spoofing and other electronic warfare techniques, putting warfighters at risk.

SUMMARY OF INVENTION

Shortcomings of the prior art can be overcome and benefits as described later in this disclosure can be achieved through the provision of a system for mitigating waveform interference and jamming. Various examples of the system are described below, and the system, including and excluding the additional examples enumerated below, in any combination (provided these combinations are not inconsistent), overcome these shortcomings. The system includes: a multiple antenna array communicatively coupled to an appliqué, wherein the appliqué comprises a receiver for data received by the multiple antenna array, wherein the multiple antenna array receives the data over a mobile network, and wherein the multiple antennas comprising the multiple antenna array provide spatial gain for the data; the appliqué comprising one or more processors, to receive the data, with the spatial gain, from the multiple antenna array, wherein the appliqué is coupled internally or externally to a given user equipment device; and the user equipment configured to communicate over the mobile network, wherein the appliqué performs a method comprising: obtaining, by the one or more processors of the appliqué, the data from the multiple antenna array with the spatial gain; identifying, by the one or more processors, in the data, a waveform comprising a frame, wherein the frame comprises a repetitive structure; leveraging, by the one or more processors, the repetitive structure to separate signals in the frame from other types of signals in the data; identifying, by the one or more processors, reference symbols in the frame; based on identifying the reference symbols, determining sources for each of the separated signals; and mitigating, by the one or more processors, interference in the data based on suppressing the data not comprising the separated signals from identified sources.

In some examples of the system, the frame comprises a long-term evolution uplink frame.

In some examples of the system, leveraging the repetitive structure to separate the signals in the frame from other types of signals in the data further comprises: hypothesizing, by the one or more processors, a start of the frame at a current lag, wherein the hypothesized start comprises a lag index; generating, by the one or more processors, a beamforming weight vector, wherein the beamforming weight vector corresponds to a spatial weight vector; determining, by the one or more processors, based on a metric exceeding a threshold that a signal comprising the frame is likely in the data; and identifying, by the one or more processors, the frame based on the likelihood.

In some examples of the system, the mitigating comprises: applying, by the one or more processors, the beamforming vector to the data to suppress signals without the repetitive structure.

In some examples of the system, determining the likelihood of the signal comprising the frame is based on determining a likelihood of the signal comprising a repeated structure cyclic prefix.

In some examples of the system, the repeated structure is a cyclic prefix.

In some examples of the system, obtaining the data from the multiple antenna array with the spatial gain further comprises: accessing, by the one or more processors, single carrier frequency division multiple access symbols in the data, each symbol comprising a cyclic prefix; copying, by the one or more processors, each cyclic prefix from an end of the single carrier frequency division multiple access symbols; and placing, by the one or more processors, each cyclic prefix at a beginning of the single carrier frequency division multiple access symbols to generate the repetitive structure.

In some examples of the system, the metric is based on the lag index and a detection metric.

In some examples of the system, the method further comprises: determining, by the one or more processors, the detection metric, wherein the determining comprises: utilizing, by the one or more processors, an automatic correlation to sum and normalize the repetitive structure over time.

Shortcomings of the prior art can be overcome and benefits as described later in this disclosure can be achieved through the provision of a method for mitigating waveform interference and jamming. Various examples of the method are described below, and the method, including and excluding the additional examples enumerated below, in any combination (provided these combinations are not inconsistent), overcome these shortcomings. The method includes: obtaining, by one or more processors, data from a multiple antenna array with spatial gain; identifying, by the one or more processors, in the data, a waveform comprising a frame, wherein the frame comprises a repetitive structure; leveraging, by the one or more processors, the repetitive structure to separate signals in the frame from other types of signals in the data; identifying, by the one or more processors, reference symbols in the frame; based on identifying the reference symbols, determining sources for each of the separated signals; and mitigating, by the one or more processors, interference in the data based on suppressing the data not comprising the separated signals from identified sources.

In some examples of the method, the frame comprises a long-term evolution uplink frame.

In some examples of the method, leveraging the repetitive structure to separate the signals in the frame from other types of signals in the data further comprises: hypothesizing, by the one or more processors, a start of the frame at a current lag, wherein the hypothesized start comprises a lag index; generating, by the one or more processors, a beamforming weight vector, wherein the beamforming weight vector corresponds to a spatial weight vector; determining, by the one or more processors, based on a metric exceeding a threshold that a signal comprising the frame is likely in the data; and identifying, by the one or more processors, the frame based on the likelihood.

In some examples of the method, the mitigating comprises: applying, by the one or more processors, the beamforming vector to the data to suppress signals without the repetitive structure.

In some examples of the method, determining the likelihood of the signal comprising the frame is based on determining a likelihood of the signal comprising a cyclic prefix.

In some examples of the method, obtaining the data from the multiple antenna array with the spatial gain further comprises: accessing, by the one or more processors, single carrier frequency division multiple access symbols in the data, each symbol comprising a cyclic prefix; copying, by the one or more processors, each cyclic prefix from an end of the single carrier frequency division multiple access symbols; and placing, by the one or more processors, each cyclic prefix at a beginning of the single carrier frequency division multiple access symbols to generate the repetitive structure.

In some examples of the method, the metric is based on the lag index and a detection metric.

In some examples of the method, the method further comprises determining, by the one or more processors, the detection metric, wherein the determining comprises: utilizing, by the one or more processors, an automatic correlation to sum and normalize the repetitive structure over time.

Shortcomings of the prior art can be overcome and benefits as described later in this disclosure can be achieved through the provision of a method for mitigating waveform interference and jamming. Various examples of the method are described below, and the method, including and excluding the additional examples enumerated below, in any combination (provided these combinations are not inconsistent), overcome these shortcomings. The method includes: obtaining, by one or more processors, data from a multiple antenna array; determining, by the one or more processors, if one or more users are active, wherein the active users are utilizing a search, wherein the determining comprises: utilizing, by the one or more processors, a de-multiplexer to correlate de-multiplexed signals in the data with reference signals, wherein each reference signal is associated with a user; identifying, by the one or more processors, active users among the one or more users, based on determining which correlated reference signals comprise active signals of interest, wherein the determining comprises: comparing, by the one or more processors, a correlation metric value for each reference signals against a pre-determined threshold, wherein the reference signals exceeding the threshold are active and comprise active signals of interest, and wherein an active signal of interest indicates an active user; and based on identifying the active users, identifying the signal of interest emissions of the active users in the data; and mitigating, by the one or more processors, interference in the signal of interest emissions of the active users.

In some examples, the method further comprises: applying, by the one of more processors, at a receiver of the multiple antenna array, to the data, a spatial beamformer, wherein the spatial beamformer maximizes a signal to noise interference ratio; and utilizing, by the spatial beamformer, multi-antenna channel-based and covariance-based processing to digitally steer the data away from sources of interference and toward the active signals of interest.

In some examples, the method further comprises: computing, by the one or more processors, a covariance matrix for the data, wherein the data comprises a received waveform; determining, by the one or more processors, weight vectors for the active users, based on the computed covariance matrix; and summing, by the one or more processors, the weight vectors for the active users to generate a common weight vector for all users.

Shortcomings of the prior art can be overcome and benefits as described later in this disclosure can be achieved through the provision of a system for mitigating waveform interference and jamming. Various examples of the system are described below, and the system, including and excluding the additional examples enumerated below, in any combination (provided these combinations are not inconsistent), overcome these shortcomings. The system includes: a multiple antenna array communicatively coupled to an appliqué, wherein the appliqué comprises a receiver for data received by the multiple antenna array, wherein the multiple antenna array receives the data over a mobile network; the appliqué comprising one or more processors, to receive the data, with the spatial gain, from the multiple antenna array, wherein the appliqué is coupled internally or externally to a given user equipment device; a de-multiplexer communicatively coupled to the one or more processors, the de-multiplexer to correlate de-multiplexed signals in the data with reference signals; and the user equipment configured to communicate over the mobile network, wherein the appliqué performs a method comprising: obtaining, by the one or more processors, the data from the multiple antenna array; determining, by the one or more processors, if one or more users are active, wherein the active users are utilizing a search, wherein the determining comprises: utilizing, by the one or more processors, the de-multiplexer to correlate the de-multiplexed signals in the data with the reference signals, wherein each reference signal is associated with a user; identifying, by the one or more processors, active users among the one or more users, based on determining which correlated reference signals comprise active signals of interest, wherein the determining comprises: comparing, by the one or more processors, a correlation metric value for each reference signals against a pre-determined threshold, wherein the reference signals exceeding the threshold are active and comprise active signals of interest, and wherein an active signal of interest indicates an active user; and based on identifying the active users, identifying the signal of interest emissions of the active users in the data; and mitigating, by the one or more processors, interference in the signal of interest emissions of the active users.

In some examples of the system, the method further comprises: applying, by the one of more processors, at a receiver of the multiple antenna array, to the data, a spatial beamformer, wherein the spatial beamformer maximizes a signal to noise interference ratio; and utilizing, by the spatial beamformer, multi-antenna channel-based and covariance-based processing to digitally steer the data away from sources of interference and toward the active signals of interest.

In some examples of the system, the method further comprises: computing, by the one or more processors, a covariance matrix for the data, wherein the data comprises a received waveform; determining, by the one or more processors, weight vectors for the active users, based on the computed covariance matrix; and summing, by the one or more processors, the weight vectors for the active users to generate a common weight vector for all users.

Systems, methods, and computer program products relating to one or more aspects of the technique are also described and may be claimed herein. Further, services relating to one or more aspects of the technique are also described and may be claimed herein.

Additional features are realized through the techniques described herein. Other examples and aspects are described in detail herein and are considered a part of the claimed aspects. These and other objects, features and advantages of this disclosure will become apparent from the following detailed description of the various aspects of the disclosure taken in conjunction with the accompanying drawings.

It should be appreciated that all combinations of the foregoing aspects and additional concepts discussed in greater detail below (provided such concepts are not mutually inconsistent) are contemplated as being part of the inventive subject matter and to achieve the advantages disclosed herein.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION OF THE INVENTION

Figure 1:
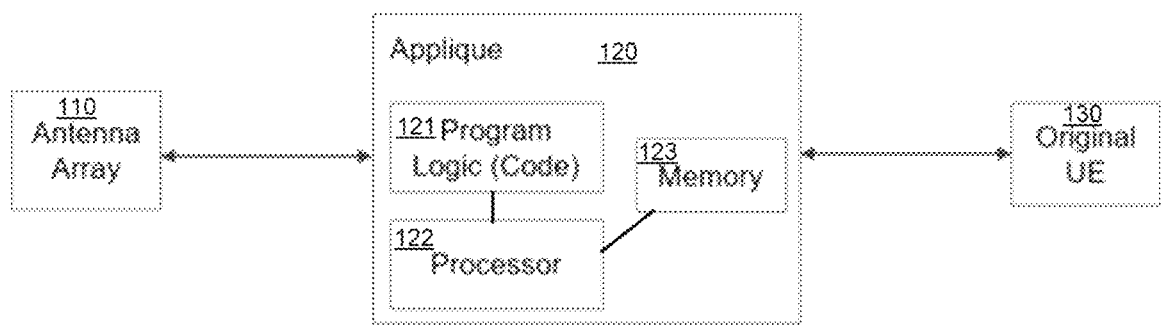
FIG. 1 depicts certain aspects of some embodiments of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, an FPGA and a GPU (graphics professor unit). Additionally, items denoted as processors may include hardware and/or software processors or other processing means, including but not limited to a software defined radio and/or custom hardware.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code includes a program/utility, having a set (at least one) of program modules, stored in a memory.

Embodiments of the present invention include an array-based interference suppression technology protects the uplink LTE waveform at an E-UTRAN Node B or Evolved Node B (eNodeB) by mitigating various types of interference with multiple antenna signal processing, including when the algorithm is a priori (i.e., relating to or denoting reasoning or knowledge which proceeds from theoretical deduction rather than from observation or experience) unaware of the interference type. Embodiments of the present invention include an appliqué solution for multi-antenna protection of LTE eNodeBs. Appliqués are attractive for situations where products being utilized for communication are inflexible, as they can be integrated into the communications channels with the product without changes to the product. For example, in tactical operations, embodiments of the present invention are useful because the military can procure commercial off-the-shelf (COTS) products from many possible sources and can integrate aspects of embodiments of the present invention to protect these products by adding an appliqué, which is an example of an embodiment of the present invention. Because eNodeBs are typically not designed to work with the appliqué, in order to avoid requiring invasive modification to the existing hardware (or software), the appliqué of some embodiments of the present invention operates with minimal interaction with the base station, using existing signal interfaces. While this appliqué protection is arguably particularly important for tactical applications, it is also relevant for LTE applications in other (non-military) environments limited by heterogeneous interference. Various aspects of embodiments of the present invention can also be used to protect 5G, WiFi, and many other waveforms. In general, these appliqué embodiments of the present invention can be utilized with a wide variety of COTS products over a large variety of communication networks, in order to mitigate jamming and interference in communications (i.e., waveforms providing the content of the communications).

As discussed above, in some embodiments of the present invention, the appliqué is an added onto an existing communications device. However, in other embodiments of the present invention, the functionality of the appliqué can be internalized at the communications device. Thus, there is flexibility in different examples of the present invention and how this functionality can be implemented. The internal appliqué can include the integration of additional hardware into a communications unit and/or the integration of program code into the Embodiments of the present invention provide technical improvements to existing communication systems and devices (technologies) and provide a practical approach to jamming/interference mitigation, with heterogeneous interference. The appliqué add-on or the internal appliqué (either hardware and/or software) represent technical improvements to communications systems. Many existing communications systems, including LTE communications systems, do not include aspects that mitigate heterogeneous interference. Thus, with the addition of the appliqué, whether the functionality of the appliqué is embodies in an external device or integrated into a communications device comprising an existing network, introduces a technical improvement to the existing network. The functionality of the appliqué is also practical. Specifically, as described herein, the signal processing enabled by the appliqué add-on or an internal appliqué includes two approaches to mitigate interference/jamming: 1) a Multiple-Antenna Schmidl-Cox (MASC) approach with lower complexity which can mitigate strong interference sources such as barrage noise, and 2) an approach based on a Reference Signal (RS) processing technique which leverages a variation on Spatial Beamforming using known waveform sequences to mitigate various types of interferers including tone, periodic, and noise. For example, for LTE waveforms, the RS processing uses an LTE Sounding Reference Signal. These specific approaches to jamming/interference mitigation in communication channels are practical applications.

Embodiments of the present invention provide functionality in this area that is significantly more robust than existing jamming/interference mitigation systems and approaches. As aforementioned, existing LTE solutions are subject to detection, interception, geolocation, jamming, spoofing and other electronic warfare techniques, putting warfighters at risk. Also, LTE eNodeBs are typically not designed to mitigate heterogeneous interference because LTE solutions typically assume operation in licensed bands where interference is mitigated through regulatory means. The interference sources can be multiple-antenna, periodic, wideband or narrowband, and may use more power than the signal-of-interest (SOI). Embodiments of the present invention, unlike present systems and methods address these types of risks to communications. Embodiments of the present invention mitigate this risk, as explained in more detail herein.

Figure 2:
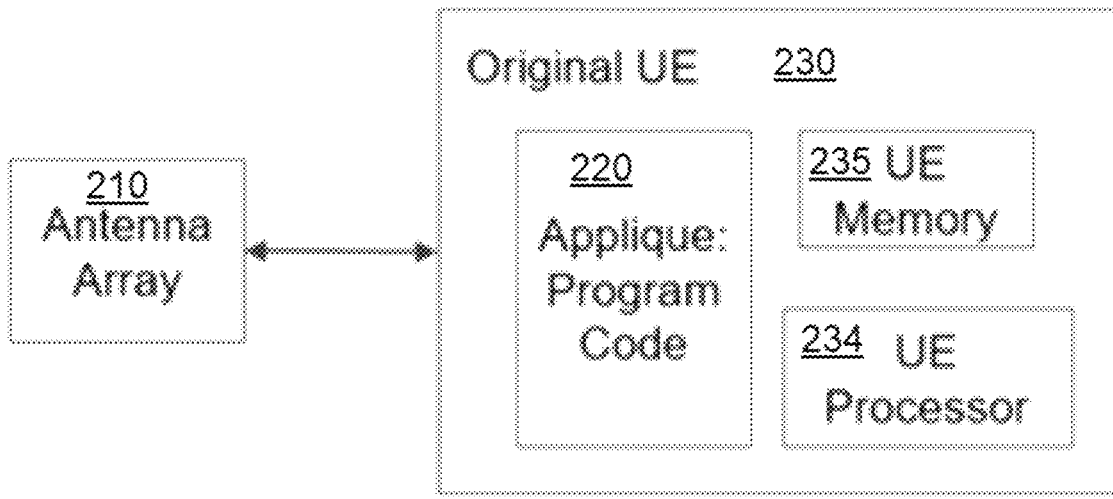
FIG. 2 depicts certain aspects of some embodiments of the present invention.

FIGS. 1-2 depict portions of a technical environment 100 200 into which aspects of various embodiments of the present invention have been integrated. Specifically, FIG. 1 is an example of a technical environment 100 with an external integration of an appliqué 120, and FIG. 2, is an example of the technical environment 200 with an internal integration of an appliqué 220.

Referring first to FIG. 1, the technical environment 110 includes an antenna array 110 (as discussed herein the jamming/interference mitigation method utilize an antenna array 110 rather than a single antenna. The antenna array is communicatively coupled to an add-on appliqué 120, which provides waveforms to a UE 130, which is not altered or adapted. In some embodiments of the present invention, the UE 130 is a COTS product. The appliqué 120 includes program code 121 executed by one or more processors 122 (one is designated in FIG. 1 as an example but is not limiting), and a memory 123 (or one or more memory devices). In some embodiments of the present invention, the program code 121 is stored in the memory 123 and the results of executing the program code on a waveform received via the antenna array 110 is also retained in memory 123. At the antenna array 110, signals are received. The signals received at the antenna array 110 are provided to the appliqué 120 and processed (as will be discussed herein) by program code 121 executing on the appliqué 120, which includes, in the depicted example, a memory 123, a processor 122, and the program logic (or program code) 121. The appliqué 120 is communicatively coupled with the UE 130 such that the program code 121 of the appliqué 120 can receive signals from the antenna array 110 and can mitigate heterogeneous interference before supplying the processed signals to a receiver (not pictured) of the UE 130.

Referring to FIG. 2, the technical environment 200 include an embodiment of an appliqué 220 that is integrated into an UE 130. Thus, this embodiment is actually program code (represented in FIG. 2 as appliqué: program code 220) that is executed by resources of the UE 130, including a processor 234 in communication with a memory 235. Thus, the appliqué 220, or the functionality attributed to the appliqué 220 is integrated into UE 230. In this integrated embodiment, the appliqué 220 comprises program code that is executable by an UE processor 234 (one processor is pictured as an example, but the program code can be executed by one or more processors), utilizing an UE memory 235 (or more than one memory resource internal to or accessible to the US processor 234), if needed. Thus, the appliqué 220 itself supplies the program logic. In these embodiments, the original UE 230 is communicatively coupled to the antenna array 210, such the program code (appliqué) 220 executing on the processor 234 of the UE 230 and accessing the memory 235 of the UE 230 can receive signals from the antenna array 210 and process the signals received to mitigate heterogeneous interference at the UE 230 (including at the receiver) itself. In this example, the appliqué 220 is integrated into, rather than communicatively coupled to, an UE receiver (not pictured).

Figure 3:
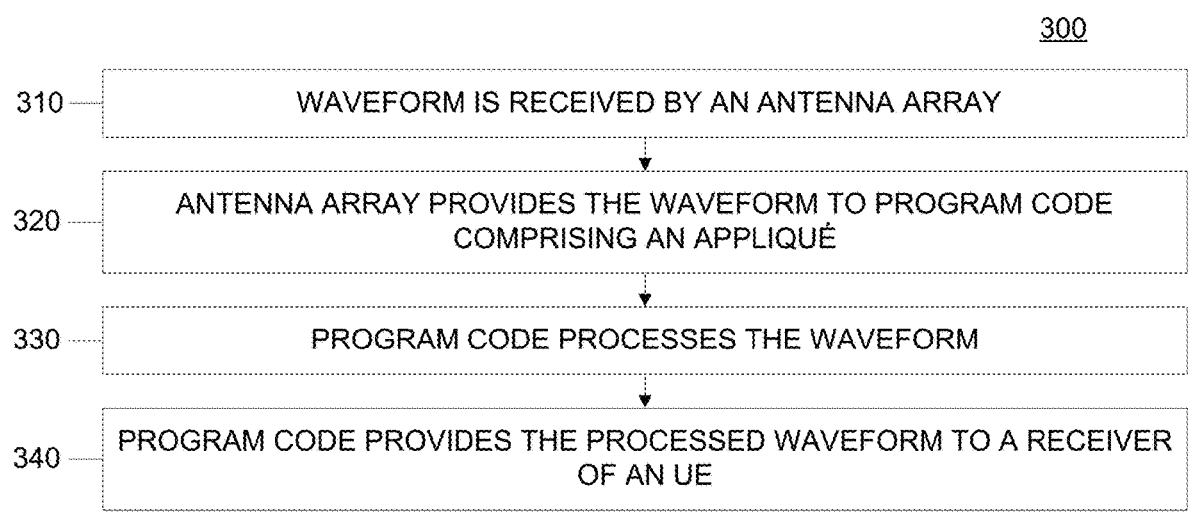
FIG. 3 is a workflow that illustrates various aspects of some embodiments of the present invention.

FIG. 3 is a workflow 300 that provides a general overview of the process by which aspects of some embodiments of the present invention provide heterogeneous interference mitigation in technical environments. This process is relevant to the implementations of the appliqué both as separate hardware and/or software coupled to an UE (e.g., FIG. 1, 120, 130), and as hardware and/or software program code integrated into an UE (e.g., FIG. 2, 220, 230). Referring to FIG. 3, in embodiments of the present invention, a waveform is received by an antenna array (310). The antenna array provides the waveform to program code comprising an appliqué (where the appliqué program code can be internal and/or external to an UE) (320). The program code processes the waveform (330). The program code provides the processed waveform to a receiver of an UE (340). The processing of the waveform by the program code mitigates heterogeneous interference in the original waveform, as received by the antenna array.

Embodiments of the present invention can process the waveform received by the antenna array using various techniques to mitigate interference/jamming. As mentioned above, two implementation are discussed herein for this mitigation. These techniques are illustrated utilizing examples in an LTE-based communications environment. However, implementations are not limited to this environment. LTE is selected for use in the illustrations to provide non-limiting examples. The advantages realized in this environment also apply to other communications environments with other waveforms, including but not limited to, 5G and WiFi. Embodiments of the present invention support trade-offs in complexity versus applicability of mitigation technique to different jammers.

Figure 4:
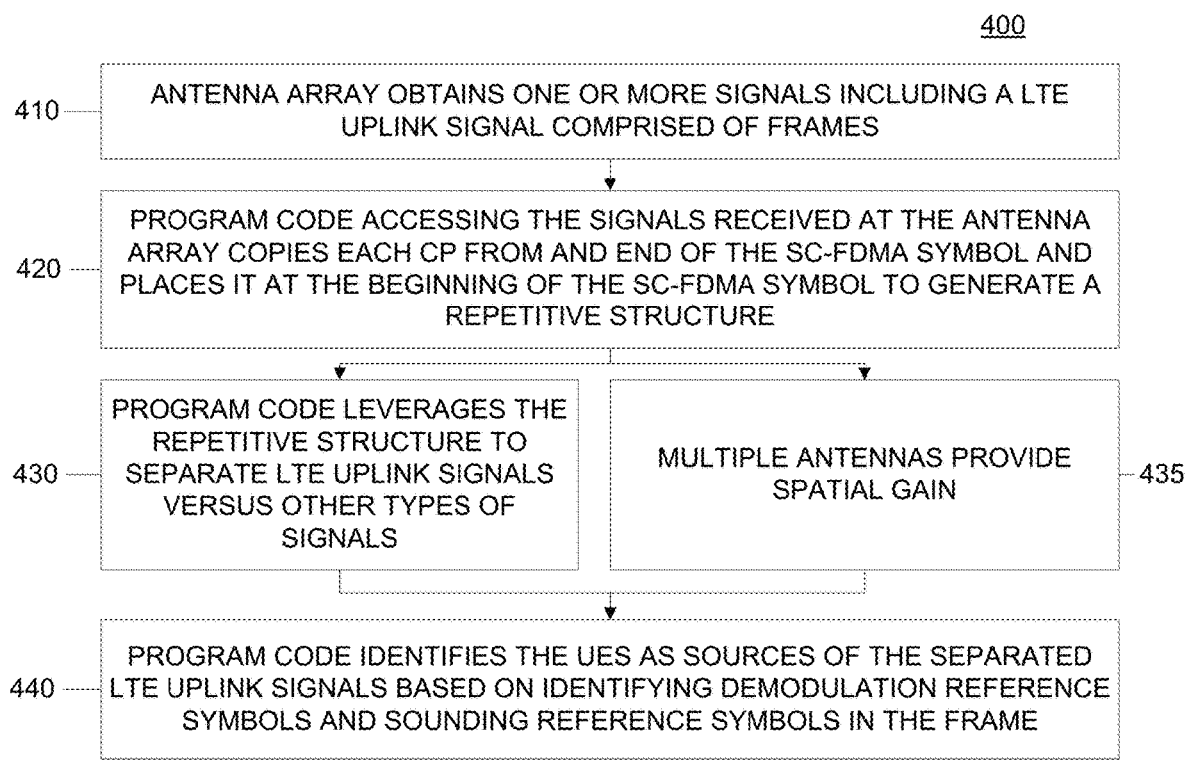
FIG. 4 is a workflow that illustrates various aspects of some embodiments of the present invention.

FIG. 4 depicts a workflow 400 of one technique which can be utilized by program code comprising the appliqué (e.g., FIGS. 1-2, 120, 220) in embodiments of the present invention can be referred to as a Multiple-Antenna Schmidl-Cox (MASC) approach. An advantage of this approach over existing interference mitigation approaches is that it involves a lower level of complexity and as such, it can be utilized to mitigate strong interference sources such as barrage noise.

The workflow 400 of FIG. 4 illustrates how embodiments of the present invention utilize array-based interference suppression with a MASC receiver, i.e., a multiple-antenna version of a Schmidl-Cox receiver to separate UE signals from interference. Techniques that utilize Schmidl-Cox employ one antenna, as opposed to the multiple antennas utilized in embodiments of the present invention. The novel use of multiple antennas in embodiments of the present invention enables these multiple antennas to simultaneously provide spatial gain, while leveraging the repetitive structure in UE signals used in LTE, 5G, WiFi and other waveforms. Thus, the program code in embodiments of the present invention can isolate waveforms from UEs to mitigate interference and jamming. Traditionally, Schmidl-Cox is a technique for orthogonal frequency-division multiplexing (OFDM), i.e., a method of encoding digital data on multiple carrier frequencies. OFDM, in general, is a scheme for wideband digital communication, used in applications such as digital television and audio broadcasting, DSL internet access, wireless networks, power line networks, and 4G mobile communications. For an OFDM technique to be effective, a receiver (i.e., program code executing at a receiver) knows at which point in time the OFDM symbol is received and hence on which received samples to perform a fast Fourier transform (FFT) technique, but this information is not available by default. Schmidl-Cox is a synchronization procedure that obtains the start of the OFDM symbol, specifically, to estimate the frame start in the time domain. Schmidl-Cox also provides a method for frequency offset estimation. Embodiments of the preset invention combine array-based interference suppression with a MASC receiver to utilize a novel multiple-antenna version of the Schmidl-Cox receiver to separate UE signals from interference.

In order for the potential interference to be mitigated by the program code of the appliqué (e.g., FIGS. 1-2, 120, 220), in embodiments of the present invention, the antenna array (e.g., FIGS. 1-2, 110, 210) effectively filters the received signals in order to separate LTE uplink signals versus other types of signals. As discussed above, the antenna array (e.g., FIGS. 1-2, 110, 210), or rather, a receiver of the array, can be configured to recognize and separate out different types of signals. Thus, the antenna array (e.g., FIGS. 1-2, 110, 210) enables the program code of the appliqué (e.g., FIGS. 1-2, 120, 220) to isolate and mitigate interference. Thus, as illustrated in FIG. 4, the antenna array obtains one or more signals including a LTE uplink signal comprised of frames (410). Each LTE uplink frame (a waveform) is comprised of SC-FDMA (Single Carrier Frequency Division Multiple Access) symbols, each of which contains a cyclic prefix (CP). The program code accessing the signals received at the antenna array (this program code can be in the appliqué and/or at the MASC receiver) copies each CP from an end of the SC-FDMA symbol and places it at the beginning of the SC-FDMA symbol to generate a repetitive structure (420). Program code (e.g., executing at the MASC receiver) leverages the repetitive structure (e.g., in an array-based interference suppression) to separate LTE uplink signals versus other types of signals (430). While leveraging the repetitive structure, the multiple antennas simultaneously provide spatial gain (435). Providing spatial gain is enabled by the use of multiple antennas as utilizing a single antenna would not enable this functionality. Program code identifies the UEs as sources of the separated LTE uplink signals based on identifying demodulation reference symbols and sounding reference symbols in the frame (440). Although LTE is provided as an example, as understood by one of skill in the art, 5G, WiFi and other waveforms include repetitive structures which can be similarly leveraged by program code at the receiver in embodiments of the present invention to separate desired signals.

Figure 5:
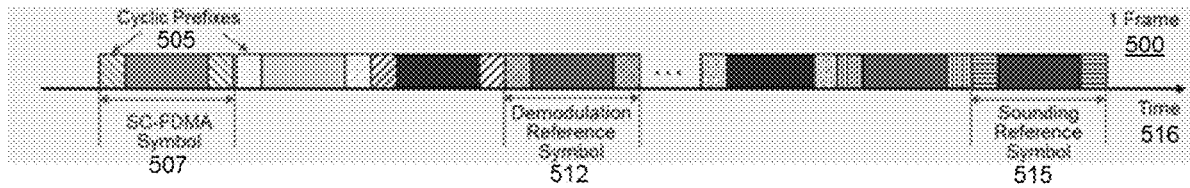
FIG. 5 depicts a LTE uplink frame and serves to illustrate the functionality described in the workflow of FIG. 4

FIG. 5 depicts a LTE uplink frame 500 and serves to illustrate the functionality described in the workflow 400 of FIG. 4. As seen in FIG. 5, the frame 500, as received over time 516, includes SC-FDMA (Single Carrier Frequency Division Multiple Access) symbols 507, each of which contains a cyclic prefix (CP) 505 that was copied, as illustrated in FIG. 4, by program code executing on at least one processing circuit, from the end of the symbol and placed at the beginning. As described in FIG. 4, this repetitive structure is leveraged in an array-based interference suppression with program code executing at a Multiple-Antenna Schmidl-Cox (MASC) receiver to separate LTE uplink signals versus other types of signals (FIG. 4, 430). This illustrated embodiment is similarly applicable to any other waveform which uses OFDM (Orthogonal Frequency Division Multiplexing) or another repeating structure. FIG. 5 also depicts the demodulation reference symbol 512 and sounding reference symbols 515 that provide known waveforms that enable the program code to identify the source UE for the frame.

Figure 6:
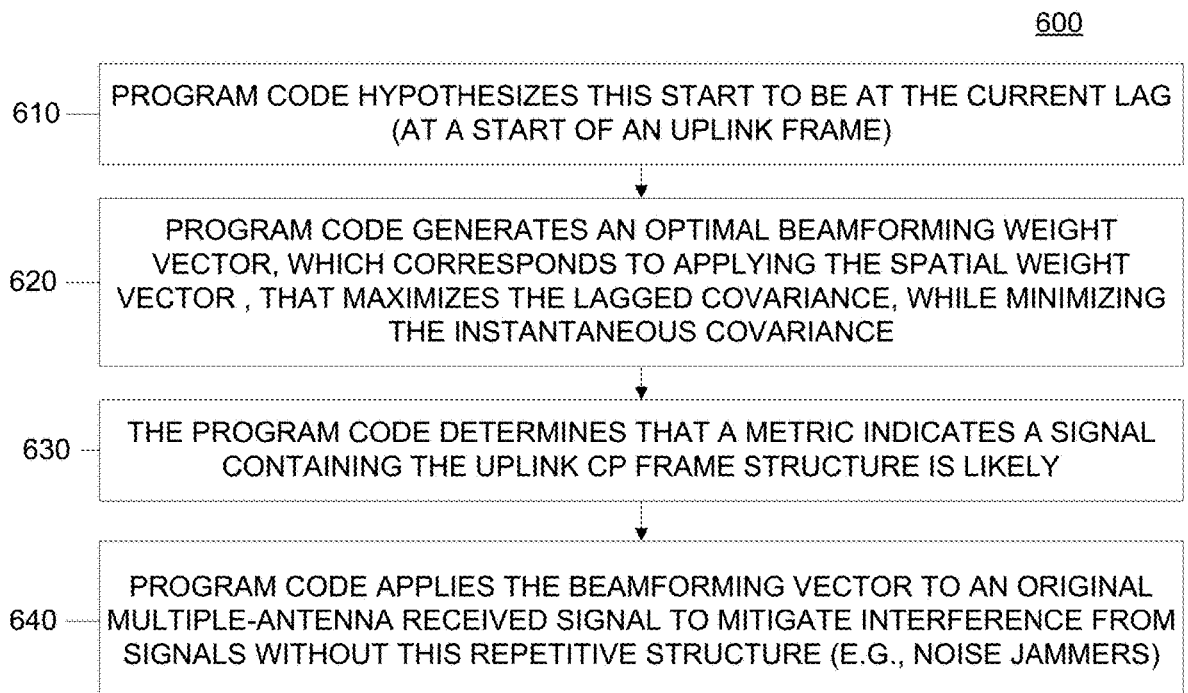
FIG. 6 is a workflow that illustrates certain aspects of how program code in embodiments of the present invention utilizes multiple antennas to simultaneously provide spatial gain, while leveraging the repetitive structure in UE signals used in LTE, 5G, WiFi and other waveforms.

FIG. 6 provides a workflow 600 that illustrates certain aspects of how program code in embodiments of the present invention utilizes multiple antennas to simultaneously provide spatial gain, while leveraging the repetitive structure in UE signals used in LTE, 5G, WiFi and other waveforms. In some embodiments of the present invention, at a start of an uplink frame, program code hypothesizes this start to be at the current lag (610). The program code generates an optimal beamforming weight vector w, which corresponds to applying the spatial weight vector, w, that maximizes the lagged covariance, while minimizing the instantaneous covariance, i.e., whiten the lagged version by the instantaneous covariance (620). The program code determines that a metric indicates a signal containing the uplink CP frame structure is likely (630). The program code applies the beamforming vector w to an original multiple-antenna received signal to mitigate interference from signals without this repetitive structure (e.g., noise jammers) (640). Thus, the program code has eliminated noise jammers, which are a repetitive structure. A signal containing an uplink CP frame structure, conversely, is the desired waveform, to be provided, for example, to an eNodeB, via an integrated or external appliqué of embodiments of the present invention. In some embodiments of the present invention, the program code builds up the weight vector over a series of observations that include CPs (including different up-link sources, but with common interference contributions) and apply it to the original multiple-antenna signal.

Figure 7:
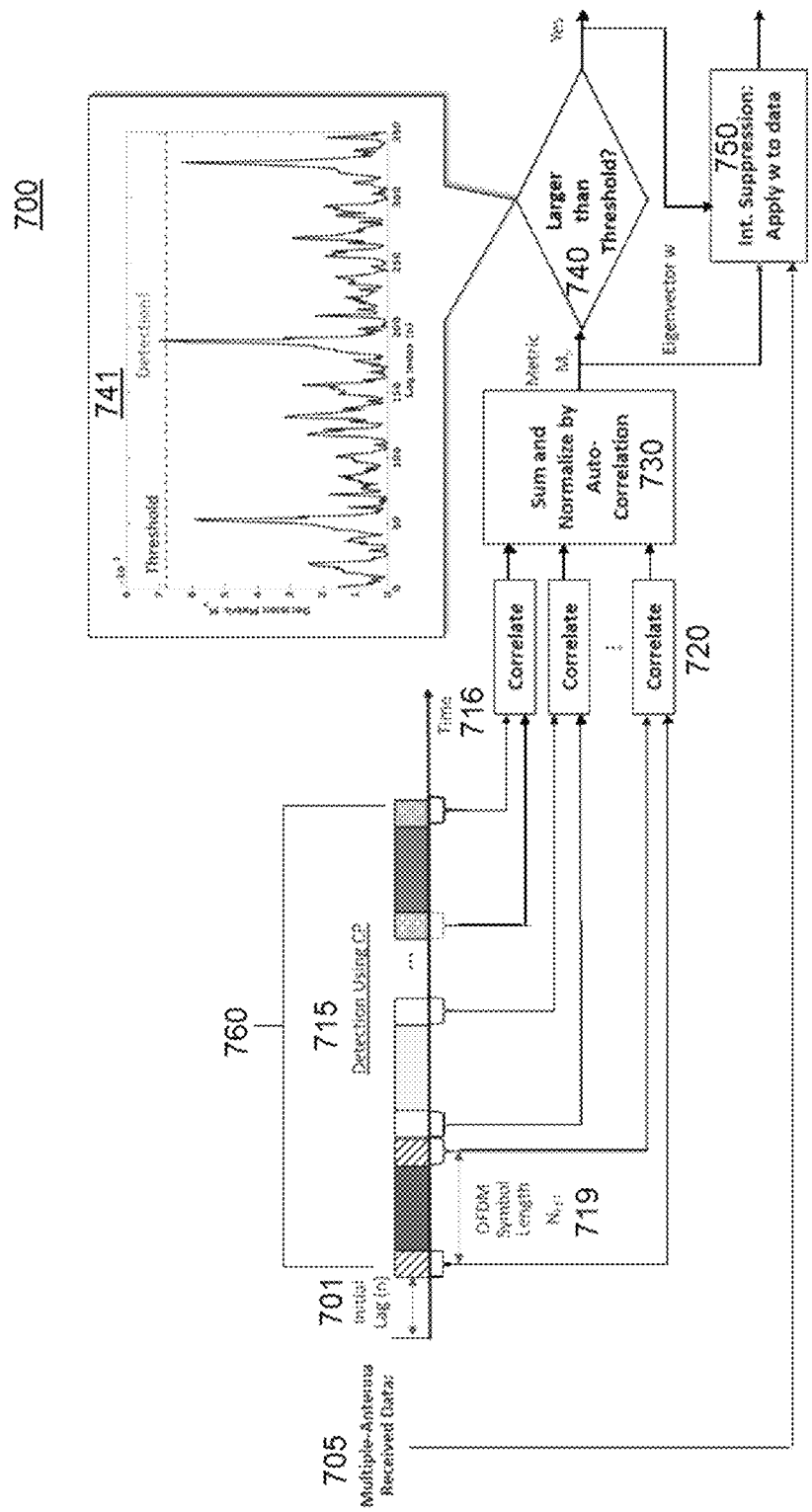
FIG. 7 illustrates aspects of the workflow of FIG. 6 in more detail.

FIG. 7 illustrates aspects of the workflow 600 of FIG. 6 in more detail. As illustrated in FIG. 7, in this workflow 700, signals are received at an antenna array which comprise multiple antenna received data 705. Program code (at a receiver and/or at an appliqué) suppressing interference within the data 750. To suppress interference, the program code identifies waveforms in the multiple antenna received data 705 based on determining that frames include uplink CP frame structure received over a given time 716. The frame 760 is received by the antenna array with the multiple antenna received data 705. Program code in embodiments of the present invention hypothesizes a start of the frame 760 at a current lag 701. The waveform 760 also includes an OFDM symbol 719, upon which the program code can perform a fast Fourier transform (FFT) technique. As discussed in FIG. 4, Each LTE uplink frame (a waveform) is comprised of SC-FDMA (Single Carrier Frequency Division Multiple Access) symbols, each of which contain a cyclic prefix (CP). The program code accessing the signals received at the antenna array copies each CP from an end of the SC-FDMA symbol and places it at the beginning of the SC-FDMA symbol to generate a repetitive structure, thus performing detection utilizing CP 715. The repetitive structure is automatically correlated 720 by the program code and summed and normalized by the automatic correlation 730. The program code determined a likelihood that the correlated waveform indicates that the signal includes the uplink CP frame structure (detection using CP 715) by determining if a metric based on a lag index and the detection metric exceeds a given threshold 740. If the threshold is reached and/or exceeded, the program code can identify the waveform and apply interference suppression to the signal 750, resulting in the waveform, without the interference. Thus, as depicted in FIG. 7, embodiments of the present invention combine program code that performs array-based interference suppression with program code at a MASC receiver that employs a novel multiple-antenna version of the Schmidl-Cox receiver to separate UE signals from interference.

Figure 8:
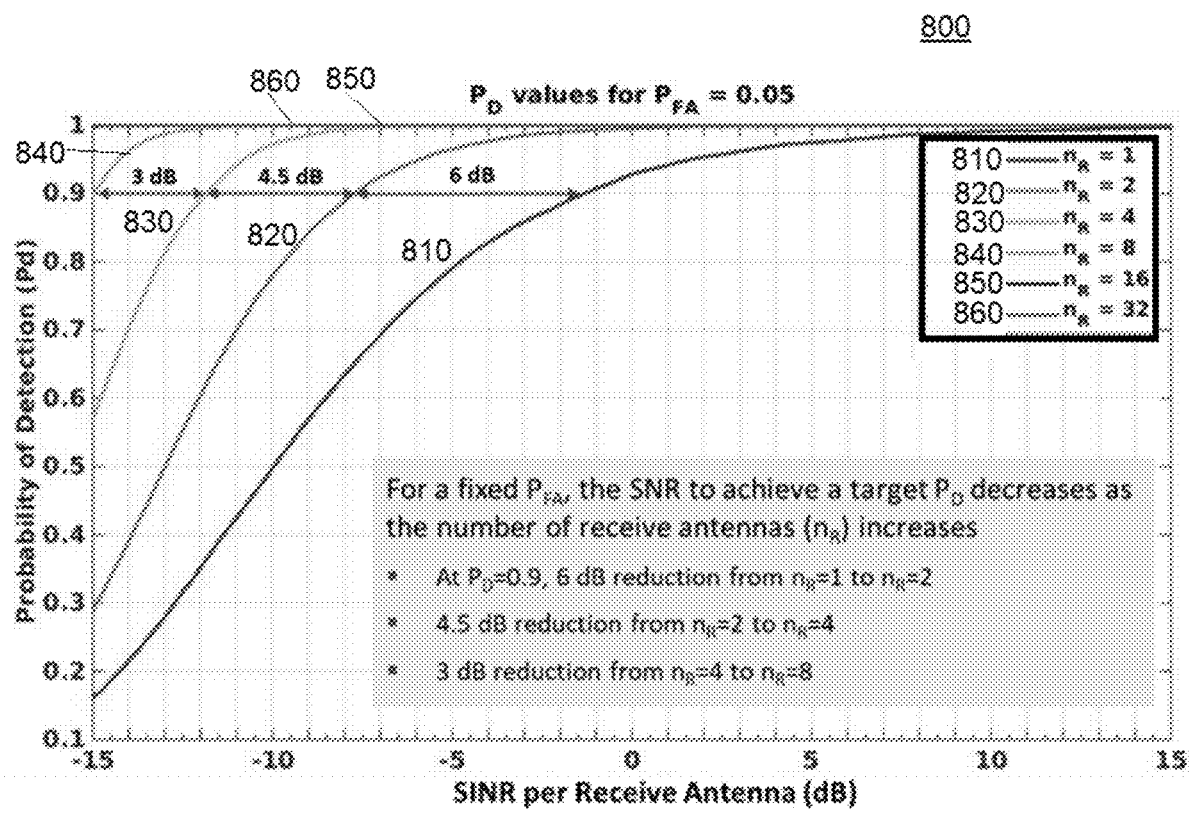
FIG. 8 is a graph that illustrates certain of the benefits of utilizing multiple antennas, as opposed to a single antenna, which is applicable to embodiments of the present invention.

FIG. 8 is a graph 800 that illustrates certain of the benefits of utilizing multiple antennas, as opposed to a single antenna, which is applicable to embodiments of the present invention. Specifically illustrated are SINR (signal to noise ratio of a given signal) improvements possible for different numbers of receive antennas (nR represents the number of receive antennas), for an example probability of false alarm value (PFA) of 5%. This is merely one illustrative example and not provided to impose or suggest any limitations to systems and method utilized in embodiments of the present invention. As illustrated in FIG. 8, for smaller numbers of antennas, higher SINR levels are needed to obtain large probability of detection (PD) values for a fixed probability of false alarm PFA values. By contrast, with more antennas, a large PD is obtainable at lower SINR and PFA values. This property is shown in FIG. 8 for an example value of PFA=0.05. At PD=0.9, there is a total reduction in SINR level of 13.5 dB when comparing the nR=1 and nR=8 cases. Thus, as depicted in FIG. 8, there is a reduction in NINR as the number of receive antennas are increased.

As noted earlier, disclose herein are at least two approaches to interference/jamming mitigation in waveforms, including LTE waveforms. FIGS. 4-8 illustrated a first approach, primarily. However, interference can also be mitigated, utilizing the technical environments of FIGS. 1-2 and the workflow 300 of FIG. 3 by mitigating this interference with an approach where program code utilizes a Reference Signal (RS) processing technique. The program code leverages a variation on Spatial Beamforming using known waveform sequences to mitigate various types of interferers including tone, periodic, and noise. The known waveform sequences are selected based on the waveforms in which the interference/jamming are being mitigated. For example, for LTE waveforms, the RS processing uses an LTE Sounding Reference Signal. Both this method and the earlier-discussed method, can determine a source of a waveform, which enhances security of the communications channel. In FIG. 5, the demodulation reference symbol 512 and sounding reference symbols 515 provide known waveforms that enable the program code to identify the source UE for a frame. In embodiments of the present invention where the program code utilizes RS processing, the program code leverages protocols which assign unique reference sequences to different users. Thus, in embodiments integrating both approaches, a given received signal can be reduced to waveforms from known UEs or users by the program code. In certain of the figures that illustrate this RS-based approach to mitigation of interference in a communication channel, the non-limiting example case of LTE sounding reference signals (SRS) is for illustrative purposes only. As observed in the figures that follow, this RS-based approach, which is integrated into certain embodiments of the present invention, maintains strong performance and flexibility to different adversarial signals through an approach illustrated in FIG. 4 for the non-limiting example case of LTE sounding reference signals (SRS).

Figure 9:
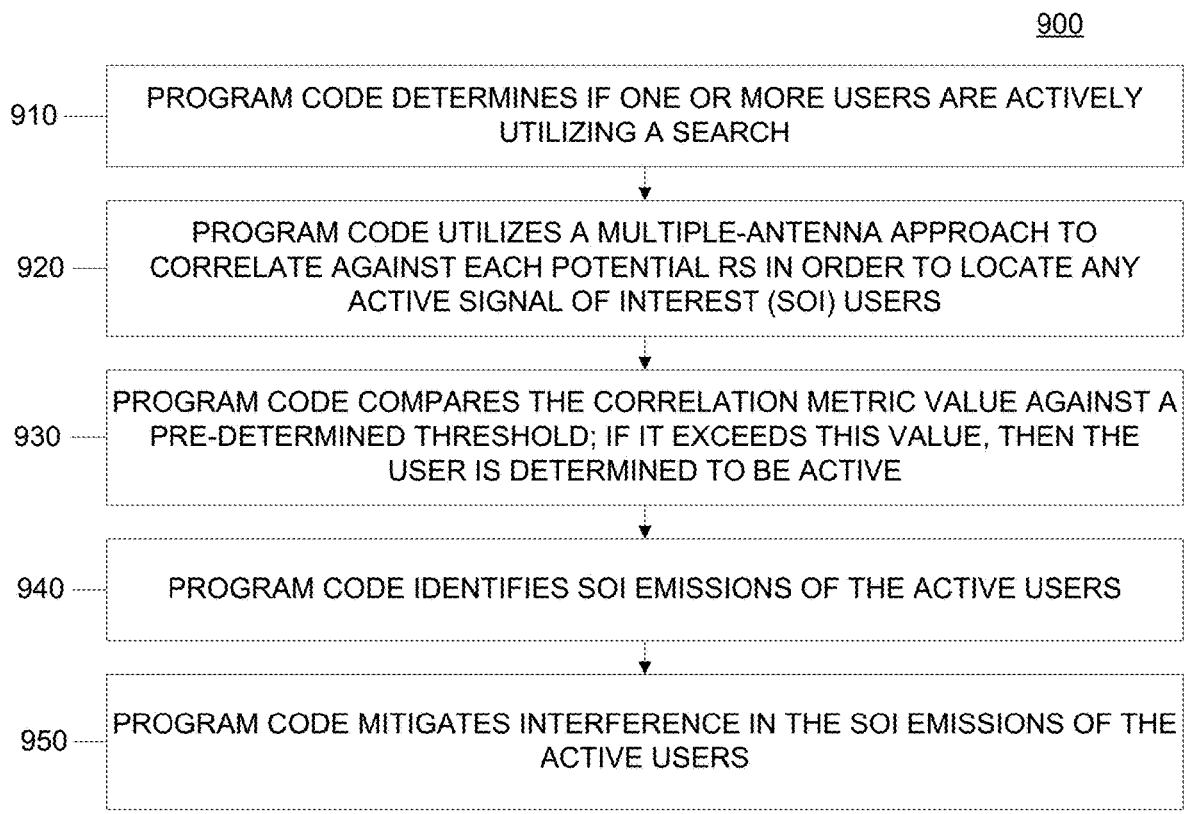
FIG. 9 is a workflow that illustrates various aspects of some embodiments of the present invention.
Figure 10:
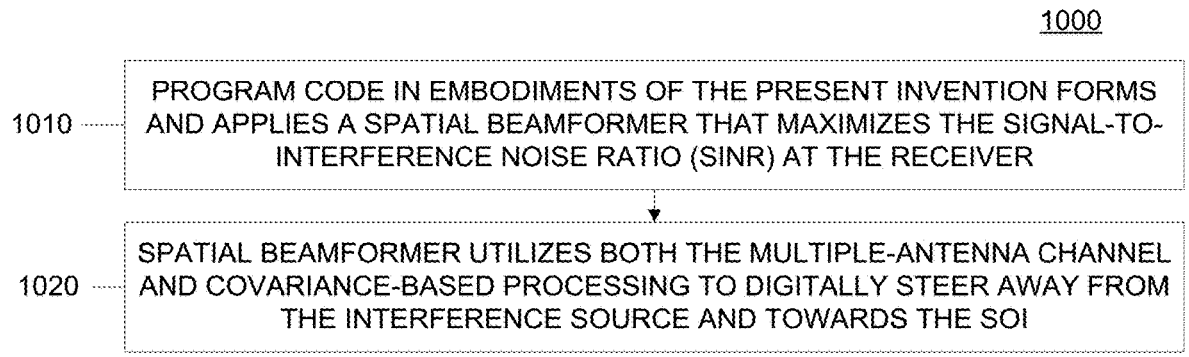
FIG. 10 is a workflow that illustrates various aspects of some embodiments of the present invention.

FIGS. 9-10 are workflows 900 1000 that depict aspects of some embodiments of the present invention that utilize an RS-based approach to mitigate interference in waveforms. This process includes two primary objectives: 1) identifying (and thus being able to isolate) emissions from active users; and 2) mitigating interference in the emissions from the active users. FIG. 9 is a workflow 900 that illustrates isolating the users. FIG. 10 is a workflow 1000 that illustrates mitigating interference in waveforms associated with the active users, once the users have been identified.

FIG. 9 is a workflow 900 that illustrates aspects of embodiments of the present invention that mitigate heterogeneous interference in communications channels based on reference signal processing. Referring to FIG. 9, in an embodiment of the present invention, program code determines if one or more users are actively utilizing a search (910). To make this determination, the program code can utilize a de-multiplexer (DEMUX), and correlate the DEMUX with a RS. The program code utilizes a multiple-antenna approach to correlate against each potential RS in order to locate any active signal of interest (SOI) users (920). Using multiple antennas and the aforementioned known sequence(s) enables integration gain across both time and space. Thus, the program code maximizes the probability of detecting each SOI by utilizing this approach. The program code compares the correlation metric value against a pre-determined threshold; if it exceeds this value, then the user is determined to be active (930). Based on determining which users are active, the program code identifies SOI emissions of the active users (940). The program code mitigates interference in the SOI emissions of the active users (950).

Referring to FIG. 10, once the SOI emissions of the active users have been identified, mitigation of interference can be performed by the program code, as illustrated in this workflow 1000. As illustrated in the workflow 1000, to mitigate interference, the program code performs a channel estimate, performs a beamformer computation, and generates a summation. Once the program code has detected each SOI and finds the SOI emission, the program code in embodiments of the present invention forms and applies a spatial beamformer that maximizes the signal-to-interference noise ratio (SINR) at the receiver (equivalently, minimizes the minimum mean squared error (MMSE) to the transmitted waveform) (1010). The spatial beamformer utilizes both the multiple-antenna channel and covariance-based processing to digitally steer away from the interference source and towards the SOI (1020). The search process performed by the program code leverages the LTE uplink frame structure, shown in FIG. 5.

To perform the operations illustrated in FIGS. 9-10, some embodiments of the present invention use an innovative Spatial Beamforming approach. In embodiments of the present invention, a known waveform structure—whether LTE, 5G, WiFi or another waveform—is leveraged by the program code to improve upon the performance of blind detection and separation.

Figure 11:
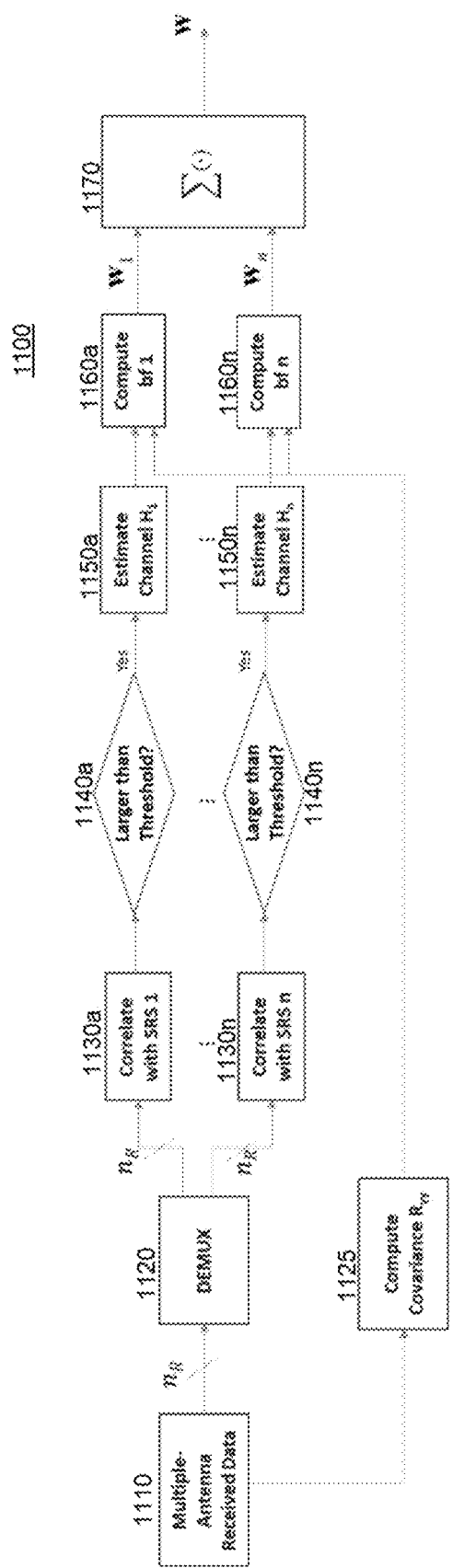
FIG. 11 is a workflow that illustrates various aspects of some embodiments of the present invention.

FIG. 11 provides a workflow 1100 that further illustrates certain details of FIGS. 9-10. FIG. 11 illustrates how in embodiments of the present invention, the program code leverages protocols which assign unique reference sequences to different users; an LTE example is shown here leveraging the known SRS sequences to first find any active users and then determine the optimal MMSE beamformer for each one. In one example, it can be shown that the optimal beamforming weight is optimal beamforming weight is $w_u^\dagger = h_u^\dagger R_{yy}^{-1}$, where the covariance matrix is $R_{yy}=E[yy^\dagger]$ and $h_{s,u}$ is the estimated channel to user u. A property of this approach is that the interference waveform does not need to be known, as the covariance matrix is computed for the entire received waveform. The channel vector $h_u$ is estimated via the RS and any known preambles; e.g. the Demodulation Reference Signal (DMRS) and SRS can be used for LTE channel estimation. The appliqué of embodiments of the present invention cannot always associate channel estimates for users (e.g. from the RS) to subsequent channel uses (e.g. the PUCCH, or Physical Uplink Control Channel). The channels for users $\{h_u\}$ are estimated by the program code, then the weight vectors for the detected users are summed by the program code, resulting in a common weight vector for all users, w, after repeating, by the program code, the above computation each possible RS value. Depending on the embodiment of the present invention and the system into which aspects of the present invention are being integrated, the resulting vector w can be normalized by a scalar, by the program code, if needed to fit within the dynamic range of the receiver. In other embodiments of the present invention, the performance can be independent of the specific scaling factor. In some embodiments of the present invention, as long as the total number of users and interference sources is less than the number of receive antennas, then there are sufficient spatial degrees of freedom in the aggregate vector w to place nulls in the direction of the interference sources and towards the directions of all users. For example, against multiple interferers (narrowband and wideband) 20+dB of interference suppression is possible.

As illustrated in FIG. 11, in an embodiment of the present invention, a multiple-antenna array receives data from one or more UEs (1100). The program code determines if one or more users are actively utilizing a search by utilizing a de-multiplexer (1120), and correlates the DEMUX with a RS (1130*a*-1130*n*). The program code also, upon receipt of the data from the multiple antennas (1100), computes a covariance matrix for the entire received waveform (i.e., the received data) (1125). As illustrated in FIG. 11, certain of the aspects are facilitated for each possible RS value (i.e., active user). The repetition of these computations can by asynchronous, parallel, cyclical, etc. However, for ease of understanding, FIG. 11 illustrates an aspect that is repeated for each user by an indicator, followed by a range a-n. Returning to FIG. 11, the program code compares the correlation metric value against a pre-determined threshold (1140*a*-1140*n*); if it exceeds this value, then the user is determined to be active. Based on determining which users are active, the program code identifies SOI emissions of the active users (i.e., estimates H (user) channels 1150*a*-1150*n*). The program code determines the weight vectors, based on the computed covariance matrix, for the detected users (1160*a*-1160*n*) and the program code sums the weight vectors (1170), resulting in a common weight vector for all users.

Embodiments of the present invention include systems, method, and computer program products. Some embodiments of the present invention include a system which includes: 1) a multiple antenna array communicatively coupled to an appliqué, where the appliqué comprises a receiver for data received by the multiple antenna array, where the multiple antenna array receives the data over a mobile network, and where the multiple antennas comprising the multiple antenna array provide spatial gain for the data; 2) the appliqué comprising one or more processors, to receive the data, with the spatial gain, from the multiple antenna array, where the appliqué is coupled internally or externally to a given user equipment device; and 3) the user equipment configured to communicate over the mobile network. In these embodiments, the appliqué (utilizing the processor(s)) performs a method that includes obtaining the data from the multiple antenna array with the spatial gain, identifying, in the data, a waveform comprising a frame, where the frame comprises a repetitive structure. The appliqué leverages the repetitive structure to separate signals in the frame from other types of signals in the data. The appliqué identifies reference symbols in the frame. Based on identifying the reference symbols, the appliqué determines sources for each of the separated signals. The appliqué mitigates interference in the data based on suppressing the data not comprising the separated signals from identified sources. The frame can comprise a long-term evolution uplink frame.

To leverage the repetitive structure to separate the signals in the frame from other types of signals in the data, the appliqué, in some embodiments, hypothesizes a start of the frame at a current lag, where the hypothesized start comprises a lag index. The appliqué generates a beamforming weight vector, where the beamforming weight vector corresponds to a spatial weight vector. The appliqué determines based on a metric exceeding a threshold that a signal comprising the frame is likely in the data. The appliqué identifies the frame based on the likelihood.

To mitigate the interference, in some embodiments of the present invention, the appliqué applies the beamforming vector to the data to suppress signals without the repetitive structure.

The appliqué can determine the likelihood of the signal comprising the frame, for example, based on determining a likelihood of the signal comprising a repeated structure cyclic prefix. In some examples of the system, the repeated structure is a cyclic prefix.

In some embodiments of the present invention, the appliqué obtains the data from the multiple antenna array with the spatial gain by: accessing single carrier frequency division multiple access symbols in the data, each symbol comprising a cyclic prefix; copying each cyclic prefix from an end of the single carrier frequency division multiple access symbols, and placing each cyclic prefix at a beginning of the single carrier frequency division multiple access symbols to generate the repetitive structure. The metric can be based on the lag index and a detection metric.

In some embodiments of the present invention, the method performed by the system includes the appliqué determining the detection metric. This determining includes the appliqué utilizing an automatic correlation to sum and normalize the repetitive structure over time.

As aforementioned, embodiments of the present invention also include a method performed by one or more processors, which can be integrated in the aforementioned appliqué or otherwise communicatively coupled to the appliqué. In some embodiments of the present invention, the processor(s) (executing program code) obtains data from a multiple antenna array with spatial gain. The processor(s) identifies, in the data, a waveform comprising a frame, where the frame comprises a repetitive structure. The processor(s) leverages the repetitive structure to separate signals in the frame from other types of signals in the data. The processor(s) identifies, reference symbols in the frame; based on identifying the reference symbols, determining sources for each of the separated signals; and mitigating, by the one or more processors, interference in the data based on suppressing the data not comprising the separated signals from identified sources. The frame can comprise a long-term evolution uplink frame.

The processor(s) can leverage the repetitive structure to separate the signals in the frame from other types of signals in the data further by: hypothesizing a start of the frame at a current lag, where the hypothesized start comprises a lag index, generating a beamforming weight vector, where the beamforming weight vector corresponds to a spatial weight vector, determining, based on a metric exceeding a threshold that a signal comprising the frame is likely in the data, and identifying the frame based on the likelihood. In some examples of the method, the metric is based on the lag index and a detection metric.

The processor(s) can mitigate the aforementioned interference by applying the beamforming vector to the data to suppress signals without the repetitive structure.

The processor(s) can determine the likelihood of the signal comprising the frame based on determining a likelihood of the signal comprising a cyclic prefix.

In some embodiments of the present invention, the processor(s) obtains the data from the multiple antenna array with the spatial gain further by: accessing single carrier frequency division multiple access symbols in the data, each symbol comprising a cyclic prefix, copying each cyclic prefix from an end of the single carrier frequency division multiple access symbols, and placing each cyclic prefix at a beginning of the single carrier frequency division multiple access symbols to generate the repetitive structure.

The method can also include the processor(s) determining the detection metric. To make this determination, in one example, the processor(s) utilizes an automatic correlation to sum and normalize the repetitive structure over time.

Some embodiments of the present invention include a method where a processor(s) obtains data from a multiple antenna array. The processor(s) determines if one or more users are active, where the active users are utilizing a search. The determining includes utilizing a de-multiplexer to correlate de-multiplexed signals in the data with reference signals, where each reference signal is associated with a user. The processor(s) identifies active users among the one or more users, based on determining which correlated reference signals comprise active signals of interest. The processor(s) makes this determination by comparing a correlation metric value for each reference signals against a predetermined threshold, where the reference signals exceeding the threshold are active and comprise active signals of interest, and where an active signal of interest indicates an active user. Based on identifying the active users, the processor(s) identifies the signal of interest emissions of the active users in the data. The processor(s) mitigates interference in the signal of interest emissions of the active users.

In some embodiments, the processor(s) applies, at a receiver of the multiple antenna array, to the data, a spatial beamformer, where the spatial beamformer maximizes a signal to noise interference ratio. The spatial beamformer utilizes multi-antenna channel-based and covariance-based processing to digitally steer the data away from sources of interference and toward the active signals of interest.

The method can also include the processor(s) computes a covariance matrix for the data, where the data comprises a received waveform. The processor(s) determines weight vectors for the active users, based on the computed covariance matrix. The processor(s) sums the weight vectors for the active users to generate a common weight vector for all users.

Embodiments of the present invention include a system that includes: 1) a multiple antenna array communicatively coupled to an appliqué, where the appliqué comprises a receiver for data received by the multiple antenna array, where the multiple antenna array receives the data over a mobile network; 2) the appliqué comprising one or more processors, to receive the data, with the spatial gain, from the multiple antenna array, where the appliqué is coupled internally or externally to a given user equipment device; 3) a de-multiplexer communicatively coupled to the one or more processors, the de-multiplexer to correlate de-multiplexed signals in the data with reference signals; and 4) the user equipment configured to communicate over the mobile network. In this system, the appliqué (program code executing on one or more processors accessible to the appliqué and/or internal to the appliqué) performs a method that includes the appliqué obtaining the data from the multiple antenna array. The appliqué determines if one or more users are active, where the active users are utilizing a search. The appliqué makes this determination by utilizing the de-multiplexer to correlate the de-multiplexed signals in the data with the reference signals, where each reference signal is associated with a user. The appliqué identifies active users among the one or more users, based on determining which correlated reference signals comprise active signals of interest. The appliqué makes this determination by comparing a correlation metric value for each reference signals against a pre-determined threshold, where the reference signals exceeding the threshold are active and comprise active signals of interest, and where an active signal of interest indicates an active user. Based on identifying the active users, the appliqué identifies the signal of interest emissions of the active users in the data. The appliqué mitigates interference in the signal of interest emissions of the active users.

In some embodiments of the present invention, the system also include the appliqué applying at a receiver of the multiple antenna array, to the data, a spatial beamformer, where the spatial beamformer maximizes a signal to noise interference ratio. The spatial beamformer utilizes multi-antenna channel-based and covariance-based processing to digitally steer the data away from sources of interference and toward the active signals of interest.

The appliqué can also compute a covariance matrix for the data, where the data comprises a received waveform. The appliqué can determine weight vectors for the active users, based on the computed covariance matrix. The appliqué can sum the weight vectors for the active users to generate a common weight vector for all users.

Figure 12:
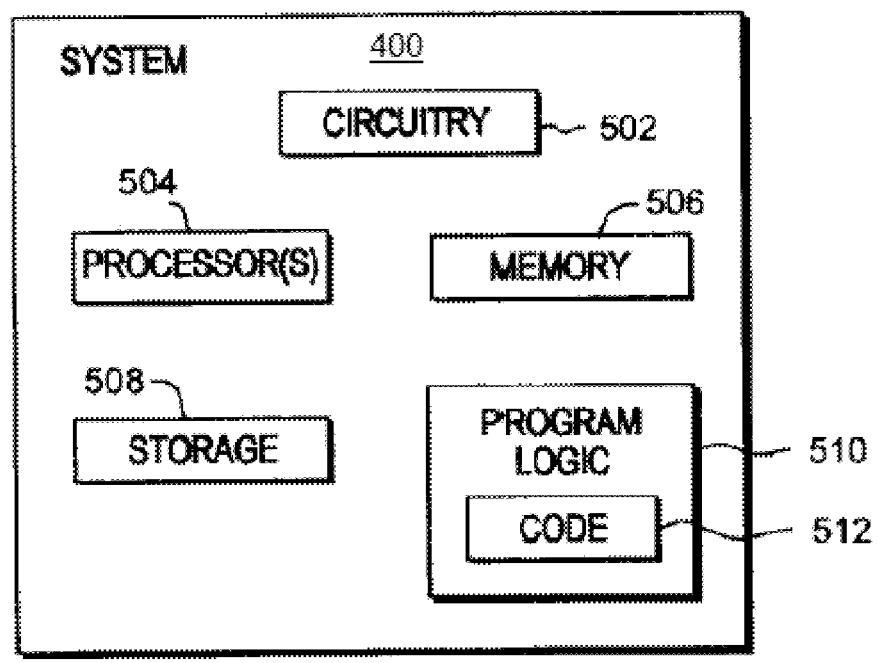
FIG. 12 illustrates a block diagram of a resource 400 in computer system, such as, which is part of the technical architecture of certain embodiments of the technique.

FIG. 12 illustrates a block diagram of a resource 400 in computer system, such as, which is part of the technical architecture of certain embodiments of the technique. Returning to FIG. 12, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 12 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 13:
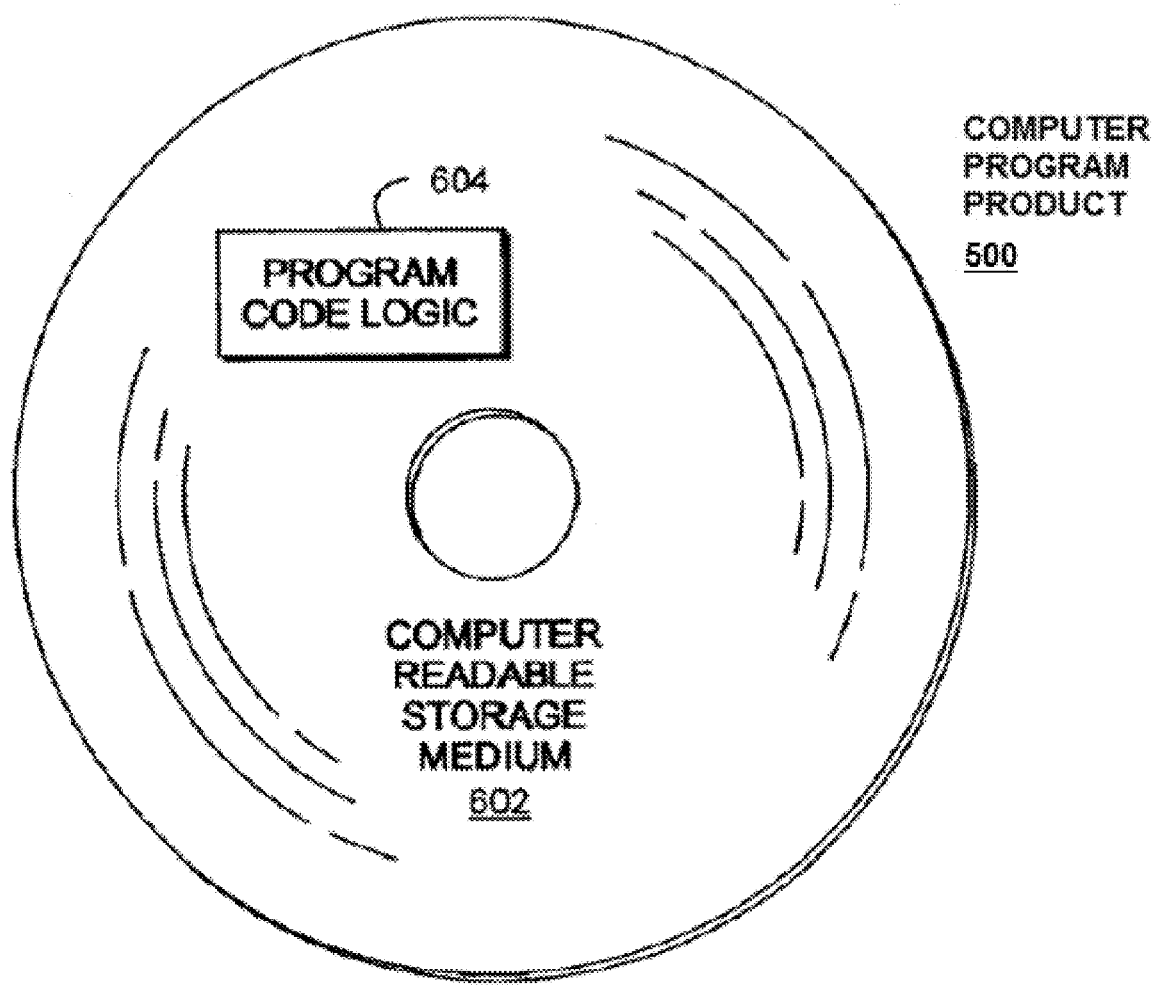
FIG. 13 is a computer program product that can be utilized in certain embodiments of the present invention.

Using the processing resources of a resource 400 to execute software, computer-readable code or instructions, does not limit where this code can be stored. Referring to FIG. 13, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated

The invention claimed is:

1. A computer system comprising:
a multiple antenna array communicatively coupled to an appliqué, wherein the appliqué comprises a receiver for data received by the multiple antenna array, wherein the multiple antenna array receives the data over a mobile network, and wherein the multiple antennas comprising the multiple antenna array provide spatial gain for the data;
the appliqué comprising one or more processors, to receive the data, with the spatial gain, from the multiple antenna array, wherein the appliqué is coupled internally or externally to a given user equipment device; and
the user equipment configured to communicate over the mobile network, wherein the appliqué performs a method comprising:
obtaining, by the one or more processors of the appliqué, the data from the multiple antenna array with the spatial gain;
identifying, by the one or more processors, in the data, a waveform comprising a frame, wherein the frame comprises a repetitive structure;
leveraging, by the one or more processors, the repetitive structure to separate signals in the frame from other types of signals in the data;
identifying, by the one or more processors, reference symbols in the frame;
based on identifying the reference symbols, determining sources for each of the separated signals; and
mitigating, by the one or more processors, interference in the data based on suppressing the data not comprising the separated signals from identified sources.

2. The system of claim 1, wherein the frame comprises a long-term evolution uplink frame.

3. The system of claim 1, wherein leveraging the repetitive structure to separate the signals in the frame from other types of signals in the data further comprises:
hypothesizing, by the one or more processors, a start of the frame at a current lag, wherein the hypothesized start comprises a lag index;
generating, by the one or more processors, a beamforming weight vector, wherein the beamforming weight vector corresponds to a spatial weight vector;
determining, by the one or more processors, based on a metric exceeding a threshold that a signal comprising the frame is likely in the data; and
identifying, by the one or more processors, the frame based on the likelihood.

4. The system of claim of claim 3, wherein determining the likelihood of the signal comprising the frame is based on determining a likelihood of the signal comprising a repeated structure cyclic prefix.

5. The system of claim 4, wherein the repeated structure is a cyclic prefix.

6. The system of claim 3, wherein the metric is based on the lag index and a detection metric.

7. The system of claim of claim 6, the method further comprising:
determining, by the one or more processors, the detection metric, wherein the determining comprises:
utilizing, by the one or more processors, an automatic correlation to sum and normalize the repetitive structure over time.

8. The system of claim of claim 1, wherein the mitigating comprises:
applying, by the one or more processors, a beamforming vector to the data to suppress signals without the repetitive structure.

9. The system of claim 1, wherein obtaining the data from the multiple antenna array with the spatial gain further comprises:
accessing, by the one or more processors, single carrier frequency division multiple access symbols in the data, each symbol comprising a cyclic prefix;
copying, by the one or more processors, each cyclic prefix from an end of the single carrier frequency division multiple access symbols; and
placing, by the one or more processors, each cyclic prefix at a beginning of the single carrier frequency division multiple access symbols to generate the repetitive structure.

10. A computer-implemented method comprising:
obtaining, by one or more processors, data from a multiple antenna array with spatial gain;
identifying, by the one or more processors, in the data, a waveform comprising a frame, wherein the frame comprises a repetitive structure;
leveraging, by the one or more processors, the repetitive structure to separate signals in the frame from other types of signals in the data;
identifying, by the one or more processors, reference symbols in the frame;
based on identifying the reference symbols, determining sources for each of the separated signals; and
mitigating, by the one or more processors, interference in the data based on suppressing the data not comprising the separated signals from identified sources.

11. The computer-implemented method of claim 10, wherein the frame comprises a long-term evolution uplink frame.

12. The computer-implemented method of claim 10, wherein leveraging the repetitive structure to separate the signals in the frame from other types of signals in the data further comprises:
- hypothesizing, by the one or more processors, a start of the frame at a current lag, wherein the hypothesized start comprises a lag index;
- generating, by the one or more processors, a beamforming weight vector, wherein the beamforming weight vector corresponds to a spatial weight vector;
- determining, by the one or more processors, based on a metric exceeding a threshold that a signal comprising the frame is likely in the data; and
- identifying, by the one or more processors, the frame based on the likelihood.

13. The computer-implemented method of claim 10, wherein the mitigating comprises:
- applying, by the one or more processors, a beamforming vector to the data to suppress signals without the repetitive structure.

14. The computer-implemented method of claim 13, wherein determining the likelihood of the signal comprising the frame is based on determining a likelihood of the signal comprising a cyclic prefix.

15. The computer-implemented method of claim 13, wherein the metric is based on a lag index and a detection metric.

16. The computer-implemented method of claim 15, further comprising:
- determining, by the one or more processors, the detection metric, wherein the determining comprises:
  - utilizing, by the one or more processors, an automatic correlation to sum and normalize the repetitive structure over time.

17. The computer-implemented method of claim 10, wherein obtaining the data from the multiple antenna array with the spatial gain further comprises:
- accessing, by the one or more processors, single carrier frequency division multiple access symbols in the data, each symbol comprising a cyclic prefix;
- copying, by the one or more processors, each cyclic prefix from an end of the single carrier frequency division multiple access symbols; and
- placing, by the one or more processors, each cyclic prefix at a beginning of the single carrier frequency division multiple access symbols to generate the repetitive structure.

* * * * *